United States Patent [19]

Blickle et al.

[11] Patent Number: 5,301,254
[45] Date of Patent: Apr. 5, 1994

[54] TRANSPARENT THERMOPLASTIC MOLDING COMPOUND AND USE THEREOF

[75] Inventors: Peter Blickle, Kelkheim; Jochen Coutandin, Langenlonsheim; Peter Herbrechtsmeier, Königstein/Taunus; Klaus Hintzer, Burgkirchen; Gerhard Wieners, Frankfurt am Main, all of Fed. Rep. of Germany

[73] Assignee: Hoechst Aktiengesellschaft, Frankfurt am Main, Fed. Rep. of Germany

[21] Appl. No.: 768,778

[22] PCT Filed: Apr. 13, 1990

[86] PCT No.: PCT/EP90/00585

§ 371 Date: Nov. 7, 1991

§ 102(e) Date: Nov. 7, 1991

[87] PCT Pub. No.: WO90/12043

PCT Pub. Date: Oct. 18, 1990

[30] Foreign Application Priority Data

Apr. 13, 1989 [DE] Fed. Rep. of Germany ....... 3912148

[51] Int. Cl.$^5$ ............................................. C08F 214/26
[52] U.S. Cl. ..................................... 385/143; 385/145; 526/247
[58] Field of Search ................. 526/247; 385/143, 145

[56] References Cited

U.S. PATENT DOCUMENTS 4,116,888 9/1978 Ukihashi et al. .

FOREIGN PATENT DOCUMENTS

| | | | |
|---|---|---|---|
| 0075312 | 3/1983 | European Pat. Off. ............ | 526/247 |
| 0077998A2 | 5/1983 | European Pat. Off. . | |
| 0128516B1 | 12/1984 | European Pat. Off. . | |
| 0128517A2 | 12/1984 | European Pat. Off. . | |
| 0130052A1 | 1/1985 | European Pat. Off. . | |
| 0193963 | 9/1986 | European Pat. Off. ............ | 526/247 |
| 0296559 | 12/1988 | European Pat. Off. ............ | 526/247 |
| 0320940 | 6/1989 | European Pat. Off. ............ | 526/247 |
| 62-285907 | 12/1987 | Japan ................... | 526/247 |
| 2-269306 | 11/1990 | Japan ................... | 526/247 |

*Primary Examiner*—Joseph L. Schofer
*Assistant Examiner*—N. Sarofin
*Attorney, Agent, or Firm*—Curtis, Morris & Safford

[57] ABSTRACT

A transparent thermoplastic molding compound consisting of 40 to 90% by weight of units derived from tetrafluoroethylene, and 60 to 10% by weight of units derived from compounds of formula I or II:

$$CF_2=CF-O-(CF_2-CF(CF_3)-O)_m-(CF_2)_n-CF_3 \quad (I)$$

$$CF_2=CF-O-(CF_2-CF(CF_3)-O)_p-(CF_2)_q-COO-R \quad (II)$$

is particularly suitable for manufacturing the sheath of beam waveguides whose core has a higher transparency than polymethyl methacrylate.

6 Claims, No Drawings

TRANSPARENT THERMOPLASTIC MOLDING COMPOUND AND USE THEREOF

The invention relates to a transparent thermoplastic molding compound from which optical objects of high transparency can be manufactured. These include especially beam waveguides, which are suitable for transmitting light signals.

Filamentous beam waveguides normally consist of a core and a sheath with different refractive indices. To transmit the light signals over long distances, firstly the core and sheath materials should absorb as little light as possible, and secondly the core material should have a higher refractive index than the sheath.

The core materials most frequently used hitherto for beam waveguides have been homopolymers and copolymers of methyl methacrylate with refractive indices of about 1.49. The principal sheath materials used have been fluorinated polymers of e.g. fluoroalkyl acrylates or methacrylates (refractive indices of between 1.37 and 1.43) or copolymers of tetrafluoroethylene, hexafluoropropene or vinylidene fluoride (refractive indices of between 1.36 and 1.39). Absorption contributions of the carbon-hydrogen bonds in the core polymers reduce the transparency of the core material and limit the transmission distance which can be achieved.

Furthermore, polymer beam waveguides have already been described which consist of polymers derived from 2-fluoroacrylic acid esters of, in particular, aliphatic alcohols, it being possible for said esters to contain deuterium atoms both in the alcohol component and in the $\beta$-position of the 2-fluoroacrylic acid component (q.v. EP 128517). These polymers have refractive indices of between 1.45 and 1.60 and glass transition temperatures of between 100° and 200° C. According to said publication, polymeric 2-fluoroacrylic acid esters of fluorinated alcohols, with a lower refractive index, are used as sheath materials for optical fibers.

The preparation and properties of the aforementioned poly(fluoroalkyl 2-fluoroacrylates) are also known (EP 128516). They have refractive indices of between 1.36 and 1.44 and softening points of between 80° and 140° C.

Moreover, it has already been proposed to use beam waveguides of [sic] poly(2-fluoroacrylic acid esters) or poly(2,3-difluoroacrylic acid esters) in the core and copolymers of TFE, perfluoroalkyl vinyl ethers and $\omega$-methoxycarbonyl(perfluoroalkyl vinyl ethers) in the sheath of a beam waveguide.

Copolymers which contain compounds of the formula I and other copolymerizable monomers and have high resistance to low temperatures are described in EP-A-077 998. The glass transition temperatures of thee compounds are in the range from $-44°$ to $-32°$ C.

Also known is the use of copolymers based on tetrafluoroethylene and compounds of the formula II for the preparation of aqueous dispersions (EP-A-193 963) and for the preparation of fluorinated copolymers containing ion exchange groups which are used for diaphragms in electrolysis (DE-A-26 50 979).

Copolymers of tetrafluoroethylene and a monomer of the formula (II) are described in U.S. Pat. No. 4,138,426. However, no data are give n on the properties of these polymers.

The object of the invention was to find a molding compound suitable for the manufacture of optical objects of high transparency, especially beam waveguides making it possible to achieve a long transmission distance for light signals in the wavelength region of visible light.

The invention thus relates to a transparent thermoplastic molding compound consisting of a) 40 to 90% by weight of units derived from tetrafluoroethylene, and b) 60 to 10% by weight of units derived to the extent of 0 to 100%, based on the sum of the compounds I and II, from compounds of formula I:

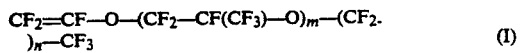

wherein m is an integer from 0 to 3 and n is an integer from 1 to 5, and derived to the extent of 100 to 0%, based on the sum of the compounds I and II, from compounds of formula II:

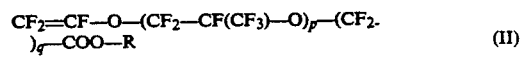

wherein p is an integer from 0 to 3, q is an integer from 1 to 4 and R is a hydrogen atom, a $C_6$–$C_{10}$ aryl radical or a $C_1$–$C_8$ alkyl radical.

The molding compound according to the invention consists of (a) 40 to 90 or preferably 70 to 85% by weight of units derived from tetrafluoroethylene.

The molding compound further includes (b) 60 to 10 or preferably 30 to 15% by weight of units derived from compounds of formula I or II:

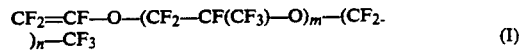

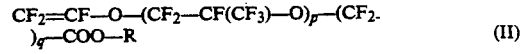

In these formulae, m is an integer from 0 to 3, preferably 0 or 1, n is an integer from 1 to 5, preferably 2 to 4, p is an integer from 0 to 3, preferably 0 or 1, q is an integer from 1 to 4, preferably 2 or 3, and R is a hydrogen atom, a $C_6$–$C_{10}$ or preferably $C_6$–$C_7$ aryl group or a $C_1$–$C_8$ or preferably $C_1$–$C_3$ alkyl group. Preferably, all or some of the hydrogen atoms in R have been replaced with fluorine, chlorine or deuterium atoms. R is most preferably a hydrogen atom or a methyl, trifluoroethyl, pentafluoro-n-propyl, tetrafluoro-n-propyl or hexafluoro-i-propyl group or a partially or completely deuterated derivative thereof.

The proportions of the compounds of formulae I and II are 0 to 100 and 100 to 0%, based in each case on the sum of the compounds I and II.

In addition to these two groups of monomers I and II, monomers which are copolymerizable with tetrafluoroethylene and the compounds I and II can be used to prepare the molding compound according to the invention, examples being chlorotrifluoroethylene, trifluoroethylene, fluoroethylene and vinylidene fluoride. Their proportion of the group of monomers (b) is 0 to 50 or preferably 0 to 20% by weight.

Furthermore, the molding compound according to the invention can also include mixtures of copolymers of the compounds (a) and (b) which differ in their composition. It is also possible to use mixtures of copolymers of compounds (a) and (b) and one or more additional fluorinated copolymers.

The molding compound according to the invention can be prepared by processes known per se, for example by suspension, emulsion, precipitation or bulk polymerization.

Furthermore, this molding compound can also be prepared by means of oxidation, saponification and then esterification of ω-H-perfluoroalkyl side-groups of polymers which contain ω-H-perfluoroalkyl vinyl ether units in addition to other monomer units.

The molding compound according to the invention is preferably used to manufacture beam waveguides. Because of its low refractive index, it is preferably used as the sheath material. Core materials which can be used are polymers containing monomer units derived from esters of methacrylic acid, acrylic acid, 2-fluoroacrylic acid or 2,3-difluoroacrylic acid, styrene or substituted styrenes, and polycarbonates.

It is advantageous to crosslink the molding compound in the form of the beam waveguide sheath material. For this purpose, the finished beam waveguide can be treated for example with an oxygen plasma.

Core materials which are preferably used are polymers having a higher transparency than PMMA. These include polymers of partially and completely deuterated MMA, partially or completely fluorinated styrene, methyl 2-fluoroacrylate and 2,3-difluoroacrylate, 2,3-difluoroacrylic acid esters, 2-fluoroacrylic acid esters, methacrylic acid esters or acrylic acid esters of chlorinated, fluorinated and brominated open-chain, alicyclic or bicyclic alcohols or benzyl or phenyl alcohols, or completely or partially deuterated derivatives thereof, copolymers of these compounds with one another and with MMA, and deuterated, fluorinated, chlorinated or brominated polycarbonates.

It is especially preferred to use polymers obtained essentially from methyl 2-fluoroacrylate, 2-fluoroacrylic and 2,3-difluoroacrylic acid esters, methacrylic acid esters and acrylic acid esters of tri-, tetra- and pentafluorinated, -chlorinated and -brominated phenols, trifluoroisopropanol and hexafluoroisopropanol, perfluoro-2,3-dimethylbutan-2-ol, perfluoro- and perchloro-cyclopentanol and -cyclohexanol, 1,4,5,6,7,7-hexachloro- and -hexabromo-bicycloheptenol, 5,5,6,6-tetrakis(trifluoromethyl)bicycloheptanol, 5,6,-difluoro-5,6-bis(trifluoromethyl)bicycloheptanol, 5,5,6,6-tetrafluorobicycloheptanol or (1,4,5,6,7,7-hexachlorobicycloheptenyl) methanol, and partially or completely deuterated derivatives thereof.

When selecting the core and sheath materials, it should be noted that maximum transmission distances for light signals in beam waveguides are achieved when the refractive indices of the core material and sheath material of a beam waveguide, $n_K$ and $n_M$ respectively, satisfy the equation $$n_K - n_M > C$$

where C=0.013, preferably 0.03 and most preferably 0.1.

The molding compound according to the invention (consisting of TFE, perfluoroalkyl vinyl ethers and ω-alkoxycarbonylperfluoroalkyl vinyl ethers) is preferably used as the sheath material when the core material is derived from fluorinated polymers having a low refractive index. In particular, the molding compound is used as the sheath material in beam waveguides whose core material consists of polymers which are derived from trifluorostyrene, pentafluorostyrene, perfluorostyrene, methacrylic acid esters, acrylic acid esters, 2-fluoroacrylic acid esters and 2,3-difluoroacrylic acid esters of fluorinated alcohols, or completely or partially deuterated derivatives thereof, and which have refractive indices of less than 1.44.

Most preferably, the molding compound is used as the sheath material when the refractive index of the core material is less than 1.37. Such low refractive indices are found for core materials containing units derived from the pentafluoro-n-propyl ester, hexafluoroisopropyl ester, 2-trifluoromethyl-3,3,3-trifluoro- or 2-trifluoromethyl-3,3,3,2-tetrafluoro-n-propylester, perfluoro-2,3- dimethylbut-2-yl ester, perfluoro-cyclopentyl or cyclohexyl ester, 5,5,6,6-tetrakis(trifluoromethyl)bicycloheptyl ester or 5,5,6,6 tetrafluorobicycloheptyl [sic] ester of methacrylic acid, acrylic acid, 2-fluoroacrylic acid or 2,3-difluoroacrylic acid, or partially or completely deuterated derivatives thereof.

The following Examples are intended to illustrate the invention.

EXAMPLE 1

3000 cm$^3$ of deionized water, 20 g of perfluorooctanoic acid and 18.6 g of ammonium oxalate were placed in an enameled polymerization vessel with a volume of 4000 cm$^3$, equipped with an impeller stirrer, and this aqueous phase was adjusted to pH 5 with ammonia. The vessel was then flushed with nitrogen and tetrafluoroethylene. 150 g of a mixture of 59 g of ω-H-perfluoropropyl vinyl ether (HPPVE) and 341 g of perfluoropropyl vinyl ether (PPVE) were added, the resulting mixture was heated to 32° C., TFE was forced in under pressure until the pressure was 5 bar, and the polymerization was started with 100 cm$^3$ of a 0.1% by weight aqueous solution of potassium permanganate. 20 dm$^3$ of TFE were introduced continuously, said temperature being maintained. After 5, 8, 11, 14 and 17 dm$^3$ of TFE had been added, 50 cm$^3$ of the HPPVE/PPVE mixture were metered in at each stage. During the reaction time of 135 minutes, a further 160 cm$^3$ of said potassium permanganate solution were continuously pumped in to keep the reaction rate constant. When the reaction was complete, the pressure in the kettle was carefully let down and the kettle was flushed with nitrogen. The polymer was precipitated from the almost transparent dispersion with hydrochloric acid and agglomerated by the addition of a small amount of methylene chloride, with stirring. The product was washed with water and dried in a fluid-bed dryer. This gave 765 g of a copolymer with a melt flow index of 1.7 g/10 min, measured at 300° C. under a load of 11 kg. The copolymer contained 3 mol % of ω-HPPVE and 17 mol % of ω-PPVE (determined from the $^{18}$F high-temperature spectrum). This product was then reacted with peroxydisulfuryl difluoride, as described in Example 2 of EP-A-88 285, and then esterified with methanol. The degree of conversion was more than 89% and the yield was almost quantitative. 770 g of functionalized product were obtained.

EXAMPLE 2

The experiment in Example 1 was repeated, except that 97 9 of methyl perfluoro-4-oxahept-5-enoate and 303 g of PPVE were used instead of the mixture of PPVE and ω-H-perfluoropropyl vinyl ether and the reaction with peroxydisulfuryl difluoride and methanol was omitted. This procedure gave a product consisting of 5 mol % of methyl perfluoro-4-oxahept-5-enoate units, 15 mol % of PPVE units and 80 mol % of TFE units (determined by means of the $^{19}$F high-temperature spectrum). The melt flow index was 2 g/10 min at 300° C. under a load of 11 kg.

EXAMPLE 3

The procedure of Example 2 was repeated, except that the mixture of methyl perfluoro-oxahept-5-enoate and PPVE was replaced with a mixture of 142 g of pentafluoro-npropyl perfluoro-4-oxahept-5-enoate and 303 g of PPVE, divided into one 165 g portion of the mixture, which was introduced at the start, and five 54 g portions of the mixture, which were metered in afterwards. This procedure gave a product consisting of 5 mol % [lacuna], 15 mol % of PPVE units and 80 mol % of TFE units. The melt flow index was 2.7 g/10 min at 300° C. under a load of 11 kg.

EXAMPLE 4

A mixture of 50 g of hexafluoroisopropyl 2,3-difluoroacrylate and 50 g of methyl 2,3-difluoroacrylate was treated with 0.3 g of t-butyl peroxyisopropylcarbonate, filtered through a membrane filter (pore width 45 nm) and introduced into a glass vessel which had been rinsed until free of particles. The mixture was degassed by having helium gas bubbled through it for a period of 20 min, the oxygen partial pressure above the mixture thereby being reduced to less than one thousandth of the saturation value. The mixture was cooled to −60° C. in a helium atmosphere and the vessel was evacuated. The glass vessel was then hermetically sealed and the product was heated first at 65° C. for 90 h and then to 115° C. at a uniform rate over a period of 50 h. The reaction mixture was cooled to give a transparent polymer having the following properties:

| Viscosity number | 61 cm$^3$/g |
|---|---|
| Residual monomer content | |
| methyl ester | 0.02% |
| hexafluoroisopropyl ester | 0.14% |
| Refractive index | 1.38 |
| Glass transition temperature | 120° C. |

EXAMPLE 5

A mixture of 80 g of hexafluoroisopropyl 2-fluoroacrylate-d$_3$ and 20 g of methyl 2-fluoroacrylate-d$_2$ was treated with 0.02 g of t-butyl peroxyisopropylcarbonate and 0.15 g of butylmercaptan, filtered through a membrane filter (pore width 45 nm) and introduced into a glass vessel which had been rinsed until free of particles. The mixture was degassed by having helium gas bubbled through it for a period of 20 min, the oxygen partial pressure above the mixture thereby being reduced to one thousandth of the saturation value. The mixture was cooled to −60° C. in a helium atmosphere and the vessel was evacuated. The glass vessel was then hermetically sealed and the product was heated first at 75° C. for 15 h and then at 115° C. for a further 24 h. The reaction mixture was cooled to give a transparent polymer having the following properties:

| Viscosity number | 47 cm$^3$/g |
|---|---|
| Residual monomer content | |
| methyl ester | 0.011% |
| hexafluoroisopropyl ester | 0.015% |
| Refractive index | 1.376 |
| Glass transition temperature | 149° C. |

EXAMPLE 6

A mixture of 80 g of hexafluoroisopropyl 2-fluoroacrylate-d$_3$ and 20 g of methyl 2-fluoroacrylate-d$_5$ was treated with 0.02 g of t-butyl peroxyisopropylcarbonate and 0.15 g of butylmercaptan, filtered through a membrane filter (pore width 45 nm) and introduced into a glass vessel which had been rinsed until free of particles. The mixture was degassed by having helium gas bubbled through it for a period of 20 min, the oxygen partial pressure above the mixture thereby being reduced to one thousandth of the saturation value. The mixture was cooled to −60° C. in a helium atmosphere and the vessel was evacuated. The glass vessel was then hermetically sealed and the product was heated first at 75° C. for 15 h and then at 115° C. for a further 24 h. The reaction mixture was cooled to give a transparent polymer having the following properties:

| Viscosity number | 51 cm$^3$/g |
|---|---|
| Residual monomer content | |
| methyl ester | <0.01% |
| hexafluoroisopropyl ester | 0.025% |
| Refractive index | 1.376 |
| Glass transition temperature | 148° C. |

The viscosity number (in cm$^3$/g) was determined on solutions of one part by weight of the polymer in 100 parts by weight of ethyl acetate at 25° C.

The residual monomer content (given in parts by weight per 100 parts of the polymer) was determined by gas chromatography, with the aid of an internal standard, on solutions of 5 parts by weight of the polymer in 100 parts of a suitable solvent.

The refractive index was measured with the aid of an Abbe refractometer on films of the polymer cast from a suitable low-boiling solvent and dried until the measured value was constant.

The glass transition temperature was determined by means of differential scanning calorimetry (DSC) at a heating rate of 20° C./min.

EXAMPLE 7

A polymer prepared according to Example 4 was melted in a ram extruder and extruded to form the core of a beam waveguide. The polymer according to Example 1 was fed into a twin-screw extruder with vent zone and processed to form the sheath of the beam waveguide. The properties of the beam waveguide are described in the Table.

EXAMPLE 8

A polymer prepared according to Example 5 was melted in a ram extruder and extruded to form the core of a beam waveguide. The polymer according to Example 2 was fed into a twin-screw extruder with vent zone and processed to form the sheath of the beam waveguide. The properties of the beam waveguide are described in the Table.

EXAMPLE 9

A polymer prepared according to Example 6 was melted in a ram extruder and extruded to form the core of a beam waveguide. The polymer according to Example 3 was fed into a twin-screw extruder with vent zone and processed to form the sheath of the beam waveguide. The properties of the beam waveguide are described in the Table.

TABLE

| Example | Core material according to Example | Sheath material according to Example | Attenuation at 650 nm [dB/km] | Attenuation at 830 nm [dB/km] | Attenuation at 650 nm after 2 h in heating cabinet [dB/km] | [°C.] | Attenuation at 650 nm after flexural test [dB/km] |
| --- | --- | --- | --- | --- | --- | --- | --- |
| 7 | 4 | 1 | 140 | 350 | 153 | 80 | 160 |
| 8 | 5 | 2 | 48 | 88 | 58 | 80 | 55 |
| 9 | 6 | 3 | 40 | 46 | 48 | 80 | 39 |

The attenuation was determined on 30 m lengths of the beam waveguides by bunching light of a particular wavelength (650 nm, 830 nm) at one end of the beam waveguide and measuring the light intensity at the other end as a function of the length of the beam waveguide, which was shortened by a certain amount after each measurement.

The attenuation is given as the gradient of a logarithmic plot of the light intensities versus the length of the beam waveguide in km.

To test the heat stability, one length of the beam waveguide was exposed to normal ambient air for two hours at each of the temperatures indicated and the attenuation was then measured.

To test the flexural strength ("flexural test"), a 20 m length of a beam waveguide was clamped in the device for measuring attenuation, the attenuation was determined and a 50 cm length of this beam waveguide was wound around a bar of 10 mm diameter. The beam waveguide was removed from the bar and straightened out. The transmitted light intensity was then measured again and the increase in attenuation as a result of deformation of the beam waveguide, converted to dB/km, was added to the attenuation of the undamaged beam waveguide.

What is claimed is:

1. A beam waveguide comprising a molding compound wherein said molding compound comprises:
   a) 40 to 90% by weight of units derived from tetrafluoroethylene, and
   b) 60 to 10% by weight of units derived to the extent of 0 to 100%, based on the sum of the compounds I and II, from compounds of formula I:

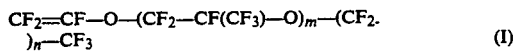

$$CF_2=CF-O-(CF_2-CF(CF_3)-O)_m-(CF_2-)_n-CF_3 \quad (I)$$

wherein m is an integer from 0 to 3 and n is an integer from 1 to 5, and derived to the extent of 100 to 0%, based on the sum of the compounds I and II, from compounds of formula II:

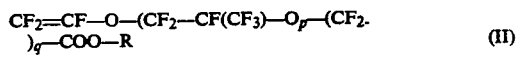

$$CF_2=CF-O-(CF_2-CF(CF_3)-O)_p-(CF_2-)_q-COO-R \quad (II)$$

wherein p is an integer from 0 to 3, q is an integer from 1 to 4 and R is a hydrogen atom, a $C_6-C_{10}$ aryl radical or a $C_1-C_8$ alkyl radical and wherein the sum of the compounds I and II is at least 10% by weight and at most 60% by weight.

2. The beam waveguide as claimed in claim 1, wherein the molding compound comprises units derived from vinyl compounds which are copolymerizable with tetrafluoroethylene and the compounds of formulae I and II.

3. The beam waveguide as claimed in claim 1 wherein the molding compound comprises units of formula II in which the radical R contains fluorine, chlorine or deuterium atoms.

4. A beam waveguide comprising a molding compound as set forth in claim 1.

5. A beam waveguide as claimed in claim 4, wherein the sheath material consists of a molding compound as set forth in claim 1.

6. A beam waveguide as claimed in claim 4, wherein the core material consists of a polymer containing units derived from trifluorostyrene, pentafluorostyrene, perfluorostyrene, methacrylic acid esters, acrylic acid esters, 2-fluoroacrylic acid esters and 2,3-difluoroacrylic acid esters of fluorinated alcohols, or completely or partially deuterated derivatives thereof, and the polymer has a refractive index of less than 1.44.

* * * * *